United States Patent [19]
Nakashima et al.

[11] Patent Number: 5,214,627
[45] Date of Patent: May 25, 1993

[54] OPTICAL DISK HAVING READ-EXCLUSIVE AND WRITE-ENABLE REGIONS

[75] Inventors: Kazuo Nakashima, Atsugi; Yasunobu Hashimoto, Sagamihara; Miyozo Maeda, Atsugi; Seiya Ogawa, Kawasaki, all of Japan

[73] Assignee: Fujitsu Limited, Kawasaki, Japan

[21] Appl. No.: 476,512

[22] Filed: Feb. 7, 1990

[30] Foreign Application Priority Data

Feb. 8, 1989 [JP] Japan ................... 1-28854

[51] Int. Cl.⁵ .............................. G11B 17/22
[52] U.S. Cl. ......................... 369/32; 369/50; 369/133; 369/240; 369/100
[58] Field of Search ............ 369/59, 54, 100, 58, 369/32, 47, 275.3, 284, 286, 272, 133, 240, 50; 358/342, 338

[56] References Cited

U.S. PATENT DOCUMENTS 4,546,461 10/1985 Isobe ...................... 369/50
4,789,979 12/1988 Hiraoka et al. ............ 369/275
4,841,515 6/1989 James ..................... 369/100
4,918,677 4/1990 Ashinuma et al. .......... 369/32
4,958,314 9/1990 Imai et al. ............... 364/900
4,975,898 12/1990 Yoshida .................. 369/100
4,998,237 3/1991 Osakabe et al. ........... 369/109

FOREIGN PATENT DOCUMENTS 0232134 8/1987 European Pat. Off. .
0275972 8/1988 European Pat. Off. .

Primary Examiner—Tommy P. Chin
Assistant Examiner—Robert Chevalier
Attorney, Agent, or Firm—Staas & Halsey

[57] ABSTRACT

An optical disk provided with read-exclusive regions where previously recorded information can be read, and with write-enable regions where information can be written. Information not desired to be rewritten can be recorded on the read-exclusive regions. The write-enable regions are open to users to freely add information thereto and to re-write information recorded. This optical disk can thus be used in various fields.

7 Claims, 8 Drawing Sheets

OPTICAL DISK HAVING READ-EXCLUSIVE AND WRITE-ENABLE REGIONS

BACKGROUND OF THE INVENTION

1. Field of the Invention

The present invention relates to an optical disk provided with read-exclusive and write-enable regions.

2. Description of the Related Art

Optical disks are media on which information can be recorded and from which information can be reproduced by a laser beam or a magnetic field. They can be grouped into three types: reproduction-exclusive or read-exclusive or read-only; information-adding or write-once-read-means; and re-write, depending upon how they are used.

The reproduction-exclusive type optical disk is a transparent disk-like substrate made of glass or resin such as polycarbonate and covered with a reflective film made of a metal such as aluminum. Information is recorded on this film in the form of concaves and convexes, and it is used exclusively for reading.

In the information-adding type, the recording film made of an easily-sublimed material such as tellurium (Te) is formed on the above described substrate and information is recorded on it in the form of holes by laser beam. Information is read by detecting these holes and a writing can be made on it only once.

The re-write type is well known as the one intended to use a magneto-optic effect (MO), phase change or the like. In the one intended to use magneto-optic effect (MO), a vertically magnetized film is formed on the substrate and information is recorded on it in such a way that the magnetic film is magnetized in various directions by heat produced by a strong laser beam and also by a magnetic field produced by additional coils. On the other hand, reproduction of information is carried out by radiating a weak laser beam onto the magnetic film so that the external magnetic field is eliminated, and by detecting polarization plane angles of light thus reflected.

This is intended to use the so-called Kerr effect, according to which polarization plane angles of reflected light differ from one another depending upon the directions of magnetization at a domain, or the Faraday effect, according to which the polarization plane of light rotates when it passes through an opto-magnetic material. For the phase-change type optical disk, the recording film creates two phase changes between non-crystal (or amorphous) and crystal or between two crystal states, depending upon temperature change. Reproduction of recorded signals is carried out using the fact that the reflection factor of light differs depending upon whether the recording film is crystal or non-crystal, or whether the recording film is in a first crystal state or in a second crystal state.

The reproduction-exclusive type optical disk has the advantage that a great many copies can be produced from it. It is used in digital audio and video disks.

The information -adding type optical disk is write-enabled, has a long life and when one writing is made on it, there is little fear of recorded signals being mistakenly erased. It is therefore used, in preference to document files and magnetic tapes, as memory means, image data files and back-ups for re-write type optical disks.

The re-write type optical disk is write-enabled, enables repeated re-writes and is therefore used in external memory means for computing machines.

In the above-mentioned conventional optical disks, however, the entire recording-enable region on the substrate or on the recording film of the substrate is used exclusively as a read or write-enable memory and optical disks having both read- and write-enable regions on the same surface of the substrate are not yet on the market.

The read-only or reproduction-exclusive type optical disk, for example, enables a large quantity of memory to be recorded on it. Further, it can be randomly accessed easily and a great many copies can be produced from it. Furthermore, it is inexpensive and it is therefore assumed that it can be used for word processor dictionaries and font-pattern storage, or disks for program and operation manual storage for computers.

Read-only or reproduction exclusive type optical disks, however, are used exclusively for reproduction and are produced in an exclusive factory. When they are supplied for word processor dictionaries, therefore, users cannot enrich them because they cannot register special font patterns such as "kanji" (Chinese characters) as external characters and special words and phrases necessary for business, cannot be added to the dictionaries.

Some functions are often added to the program and the program is often patched to correct bugs in it. This patching is often made to a short program.

When a program stored in a reproduction-exclusive type optical disk is supplied to users, therefore, they cannot re-write the program data. Even when the program can be corrected by patching, they are forced to buy a new reproduction-exclusive type optical disk to make a minor correction to the program.

Further, it is a big burden to program suppliers and it is unrealistic to produce new reproduction-exclusive type optical disks every time programs are corrected.

It is therefore supposed that demand for an optical disk with a write-enable region on which users can write any information they like, as well as a read-exclusive region, will increase in the future.

An optical disk having read-exclusive and write-enable regions will be used so that items such as mathematical formulae which do not need to be rewritten are recorded on its read-exclusive region and that operational and process results are recorded on its write-enable region.

Two kinds of mark-length and mark-position recording systems are well known for these information recording systems.

FIG. 1 is intended to explain the mark length recording system. In this recording system, an edge 3 and 4 of a recording pit 2 denotes signal "1" and an unedged portion represents signal "0." Signals 6 are recorded on the disk in response to clocks 5 which are synchro signals for recording information.

More specifically, an edge 3 of the recording pit 2 on which the scanning laser beam passes when it passes from the disk surface 1 onto the recording pit 2 or edge 4 of the recording pit 2 onto which the scanning laser beam passes when it comes out of the recording pit 2 onto the disk surface 1 represents signal "1", while the surface 1 of the disk which does not have an edge 4 or flat plane of the recording pit 2 denotes signal "0". Information is reproduced by detecting whether or not edge 3 or 4 of the recording pit 2 is present in the positions corresponding to clocks 5, radiated by a reading laser beam. This mark length recording system is also called the recording system intended to use mark length modulation.

FIG. 2 is intended to explain the mark position recording system. Signal "1", corresponding to a clock 15, is recorded on the disk, when recording pit 12 is formed there by the laser beam irradiation, and signal "0" is recorded when no recording pit 12 is formed on the disk. For this mark position recording system, information is read by detecting whether or not the recording pit 12 is present at the position corresponding to clock signal 15. This mark position recording system is also called the recording system intended to use mark position modulation.

In comparing the above two recording systems it is found that the mark length recording system has a recording density two times that of the mark position recording system. This is because it is intended o record information on the disk using edges 3 and 4 of a hole (or recording pit 2). For the mark length recording system, however, position control for accurately detecting edges 3 and 4 of the recording pit 2 becomes more complicated because edges 3 and 4 of the recording pit 2 must be detected in synchronization with clock signals 5. Therefore, the mark length recording system has been applied to the optical disk of the read-exclusive type and the mark position recording system has been applied to the optical disk of the write-enable type.

More specifically, the mark length recording system is employed for the read-exclusive type optical disk because concave and convexe portions can be preformed on the disk with high positional accuracy. The rotation control of the optical disk is carried out according to a CLV (constant linear velocity) method. On the other hand, the mark position recording system is employed for the write-enable type optical disk because it is difficult to accurately position the recording pits on the disk. The rotation of the disk is controlled in this case according to the CAV (constant angular velocity) method.

In the CLV method, the linear velocity at which information is recorded on a track of a disk and reproduced from it is made constant for all tracks. As the tracks approach the outer circumference of the disk, therefore, the number of recording pits formed per track becomes larger. This enables a higher memory capacity. However, the rotation control of a spindle motor for driving the optical disk becomes more complicated.

In the CAV method, the rotational velocity of the spindle motor is constant and the recording and reproducing frequency is not changed. This simplifies control of the spindle motor and the control circuit system for the spindle motor and enables the spindle motor itself to be made smaller. However, the memory capacity per track on the disk is determined by the number of marks (or information content) which can be recorded on the innermost track of the disk. The total memory capacity of the disk is thus made smaller than that with the CLV method.

SUMMARY OF THE INVENTION

The present invention is therefore intended to eliminate the above-mentioned drawbacks and the object of the present invention is to provide an optical disk having read-exclusive and write-enable regions on a disk substrate.

According to the optical disk of the present invention, a read-exclusive and a write-enable region are provided on an optical disk and information is recorded on that read-exclusive region of the disk, from which information is only read, according to the mark length recording system which enables concaves and convexes to be formed on the disk with high positional accuracy and at a high recording density. User information can record on the write-enable region of the disk, according to the mark position recording system.

The read-exclusive region is located along the inner circumference of the disk while the write-enable region is located along the outer circumference of the disk. The recording frequency employed to record information on the write-enable region of the disk is set at double that employed for the read-exclusive region of the disk.

Because the CAV method, which enables the rotation of the spindle motor to be easily controlled, is used to record on the disk and to reproduce it from the disk, access speed relative to the disk can be made high when the disk is used as a peripheral device for computers. The drawback of this method causes the recording density of information to become lower as tracks, come nearer to the outer circumference of the disk. This can be eliminated because the read-exclusive region, where concaves and convexes can be easily formed at high recording density with high accuracy according to the mark length recording system, is located along the inner circumference of the disk while the write-enable region, where recording and reproducing of information can be carried out according to the mark position recording system, is located along the outer circumference of the disk. Furthermore, the recording frequency employed to record information on the write-enable region of the disk is made double that employed for the read-exclusive region of the disk. This makes the recording capacity per track on the write-enable region equal to that on the read-exclusive region.

The read-exclusive and write-enable regions may be arranged alternately, starting from the inner circumference of the disk and moving to the outer circumference. In this case, information is recorded on the read-exclusive regions according to the mark length recording system and user information is recorded on and reproduced from the write-enable regions according to the mark position recording system.

The read-exclusive and write-enable regions are arranged alternately, starting from the inner circumference of the disk and moving to the outer circumference. The recording frequency used for the write-enable regions is made double that used for the read-exclusive regions. Information is recorded on these read-exclusive and write-enable regions at the same angular rotation velocity. The access speed and the recording density can thus be made high, as described above.

Further, the read-exclusive and write-enable regions are arranged alternately as described above. The angular rotation velocity of the disk selected when information is recorded on the write-enable regions according to the mark position recording system is made slower than that selected when information is read from the read-exclusive regions. The recording frequency employed to record information on the write-enable regions on the basis of the angular velocity is set so as to make the recording capacity per track on the write-enable regions equal to the recording capacity per track on the read-exclusive regions. Furthermore, the disk's rotation angular velocity, selected when information is read from the write-enable regions, is made equal to that selected when information is read from the read-exclusive regions.

The deterioration in recording sensitivity resulting from the light quantity of the irradiated laser beam being lowered when information is recorded at a high angular rotation velocity, can thus be prevented by decreasing the rotation angular velocity at the time information is recorded onto the write-enable regions of the disk.

The disk's rotation angular velocity, selected when information is reproduced, is constant in this case in both the read-exclusive and write-enable regions. This enables the access speed to be made high when information is read.

Still further, when the read-exclusive and write-enable regions are arranged alternately on the disk, as described above, and information is recorded according to the mark position recording system, the rotation control of the disk is carried out according to the multi-stage CAV method in which the angular velocity of the disk is made variable in accordance with a radial position (a radial region) and the variable control of recording frequency is carried out in response to the linear velocity (i.e., in response to the position in the radial direction of the disk).

This variable control of recording frequency is carried out, for example, in such a way that the memory capacity per track of information recorded on the write-enable region is made equal to that on the corresponding read-exclusive region. Furthermore, it is arranged in this case that angular rotation velocity selected when the information is read from the read-exclusive regions, is made equal to that selected when information is read from the write-enable regions.

When these arrangements are made, the memory capacity per track can be made equal on both of the read-exclusive and write -enable regions and the angular rotation velocity can be made the same and constant on both of them. This enable the access speed to be made high.

DESCRIPTION OF THE PREFERRED EMBODIMENTS

The preferred embodiment of the present invention will be described in detail with reference to the accompanying drawings.

Figure 1:
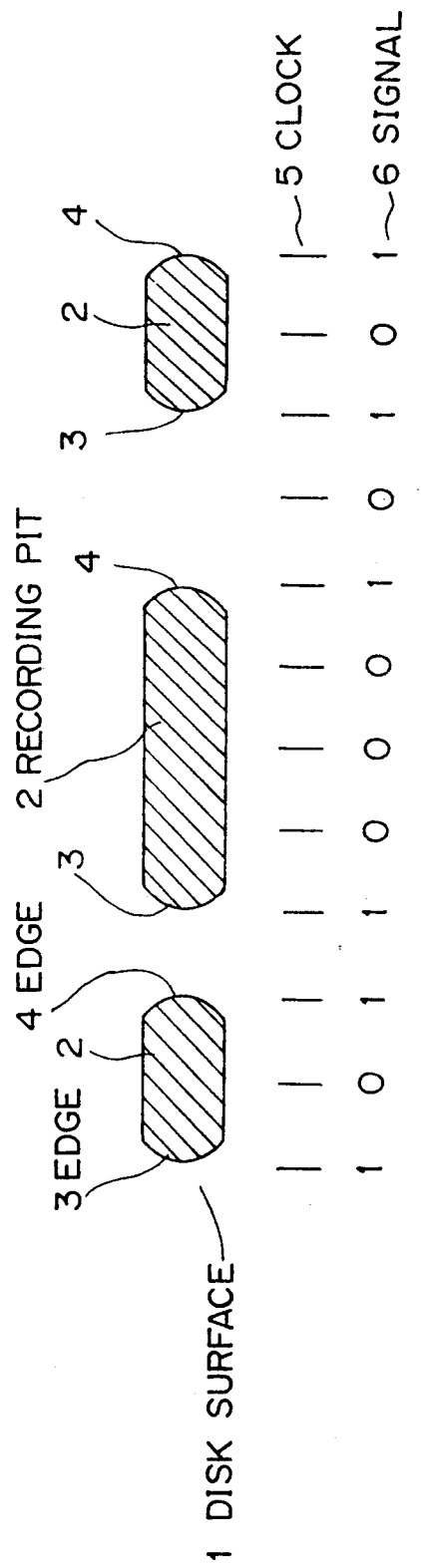
FIG. 1 is a diagram for explaining the mark length recording system.
Figure 2:
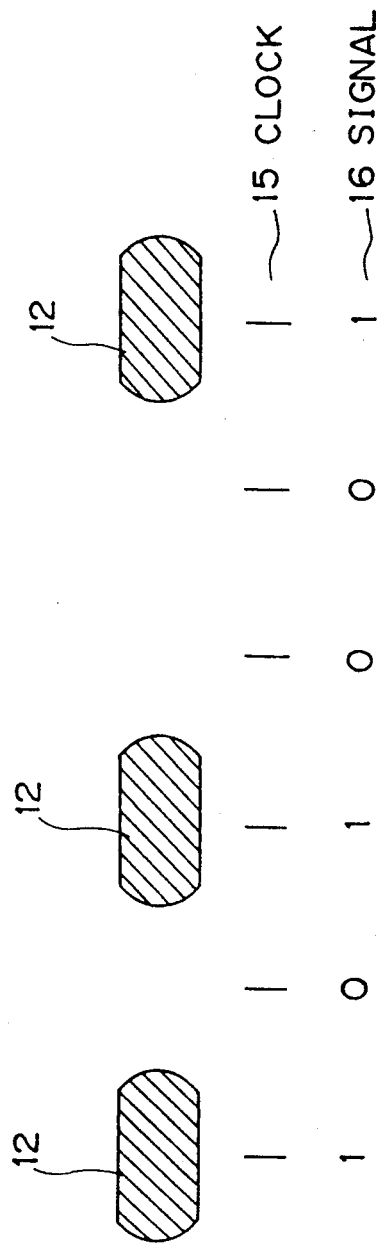
FIG. 2 is a diagram for explaining the mark position recording system.
Figure 3:
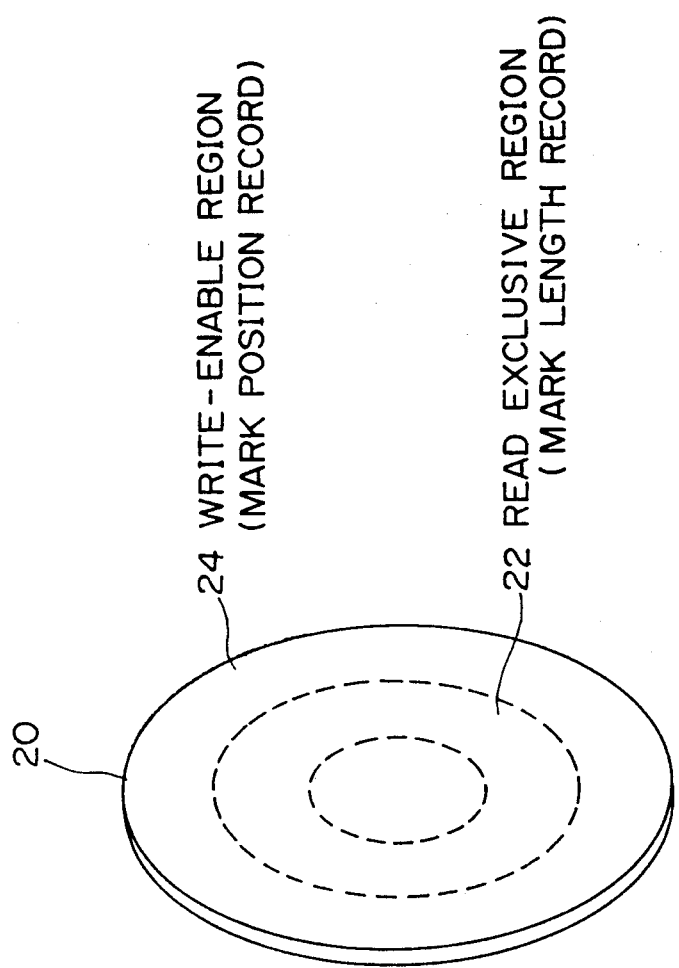
FIG. 3 is a first example of an optical disk according to the present invention.

FIG. 3 shows the first example of the optical disk according to the present invention.

An optical disk 20 is made by coating a transparent substrate with a light-sensitive substance such as TbFeCo, TbFe, or GdGeCo, by sputtering or vapor deposition preferably, with lower and upper layers of dielectric material such as $SiO_2$, SiN or $Tb+SiO_2$ to protect the light sensitive member. The disk is 5 inches and it is made of glass or a plastic such as polycarbonate resin. When it is radiated by a strong laser spot, the light sensitive recording member is recorded thermo-magnetically. When it is radiated by a weak laser spot, it becomes a reflection film which reflects the weak laser spot. When it is radiated by a strong laser beam spot with a weak magnetic field applied to it from outside, information can be rewritten on the light sensitive member by light modulation. When information is already recorded on the disk, this recorded information is erased and new information is then recorded by light modulation.

As shown in FIG. 3, a read-exclusive region 22 from which information can be read is located along the inner circumference of the disk 20 and a write-enable region 24 on which information can be written is located along the outer circumference. More specifically, information is recorded on the read-exclusive region 22 according to the mark length recording system while information is recorded on the write-enable region 24 according to the mark position recording system.

As shown in Table 1, an area of the disk from 33 mmR to 70 mmR outward and in the radial direction of the disk is allotted to the read-exclusive region 22 and a next area thereof from 70 mmR to 105 mmR outward and in the radial direction of the disk is allotted to the write-enable region 24.

TABLE 1

|  | Read-exclusive Region | Write-enable Region |
| --- | --- | --- |
| Radial Position | 35 mm–70 mm | 70 mm–105 mm |
| Rotation Number | 1800 rpm | 1800 rpm |
| Recording Frequency | 3.3 MHz | 6.6 MHz |

When information is to be recorded on the read-exclusive and write-enable regions 22 and 24, the rotation number of the optical disk 20 is the same, that is, 1800 rpm, for both regions. However, recording frequency for the read-exclusive region 22 is 3.3MHz while that for the write-enable region 24 is 6.6MHz.

The recording of information is carried out according to the CAV (constant angular velocity) method, keeping the rotation speed of the disk 20 at 1800 rpm.

Figure 4:
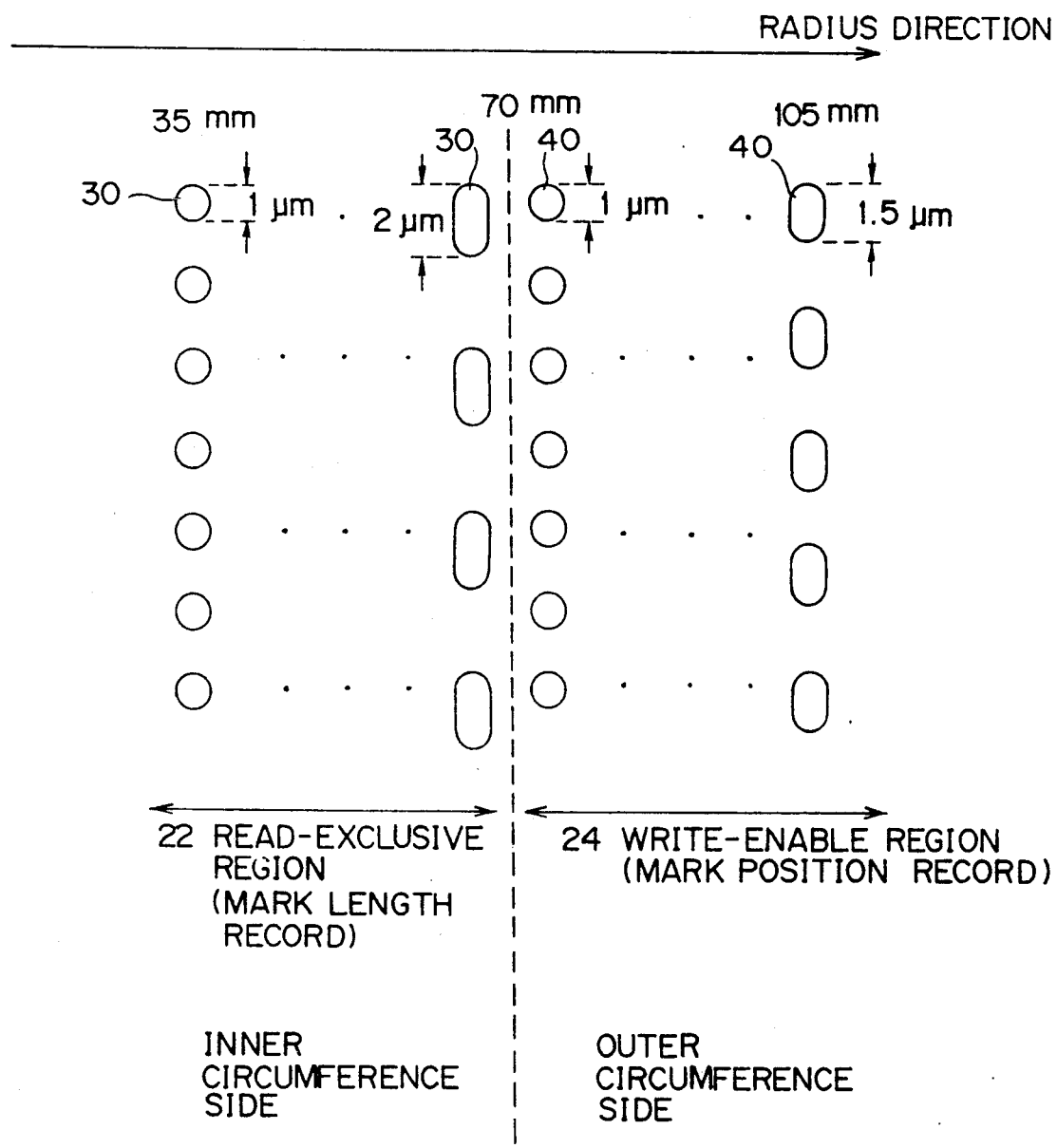
FIG. 4 is a diagram of how information is recorded on read-exclusive and write-enable regions of the optical disk in FIG. 3.

FIG. 4 shows how information is recorded on the read-exclusive and write-enable regions 22 and 24.

Information is pre-recorded as pits (or holes) 30 on the read-exclusive region 22 and the length (or pit length) of each of the pits 30 is 1 μm at the radial position 35 mm and 2 μm at the radial position 70 mm. This is because information is recorded on the read-exclusive region 22 at a disk rotation speed of 1800 rpm and according to the CAV method, and because the pit length increases as the tracks approach the outer circumference of the disk.

When the optical disk 20 is handed to users, a pre-format is formed on the write-enable region 24. More specifically, only an ID section where a guide groove for holding the laser beam spot at a certain position, track numbers for enabling sector positions to be identified, and sector numbers are written is formed on the write-enable region 24. The length of each domain 40 corresponding to a pit 30 is 1 μm immediately outside the radial position 70 mm and 1.5 μm at the radial position 105 mm, which is the outermost circumference of the write-enable region 24. This is because the disk rotation speed is 1800 rpm when information is recorded on both the read-exclusive and write-enable regions 22 and 24, and because the frequency (or information recording frequency) is 6.6MHz in the write-enable region 24, which is double that in the read-exclusive region 22 (3.3MHz). As described above, information is recorded on the write-enable region 24 according to the mark position recording system. The recording density in the write-enable region 24, where information is recorded according to the mark position recording system, becomes half that in the read-exclusive region 22, where information is recorded according to the mark length recording system. However, the recording frequency (6.6MHz) at the write-enable region 24 is made double that in the read-exclusive region 22 (3.3MHz) to make the memory capacity per track equal on both of the read-exclusive and write-enable regions 22 and 24.

The rotation speed of the optical disk 20 for both the read-exclusive region 22 and write-enable region 24 when information is read (or reproduced) is also 1800rpm, which is equal to that at which information is recorded. Therefore, the reproducing frequency is 6.6MHz.

Figure 5A:
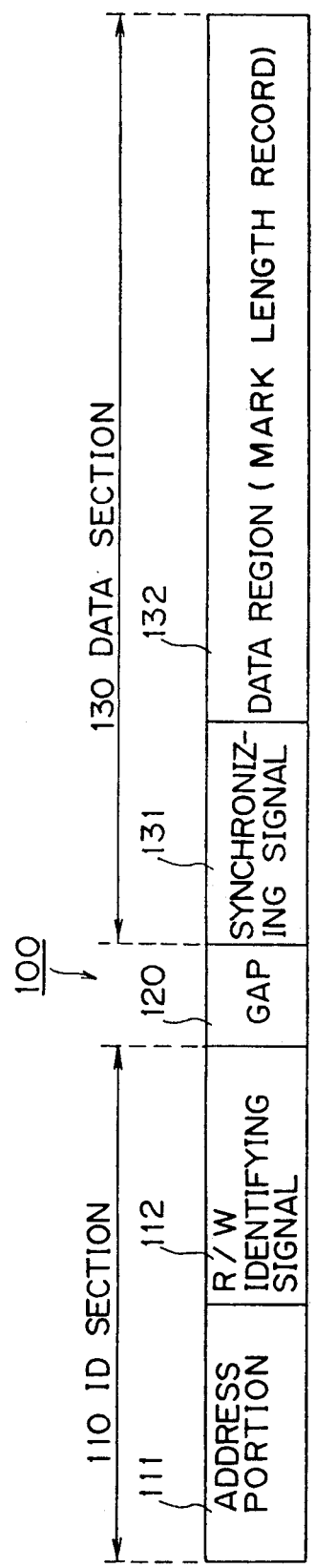
FIGS. 5A and 5B are diagrams of how sectors are formed on both of the read-exclusive and write-enable regions of the disk optical disk in FIG. 3.
Figure 5B:
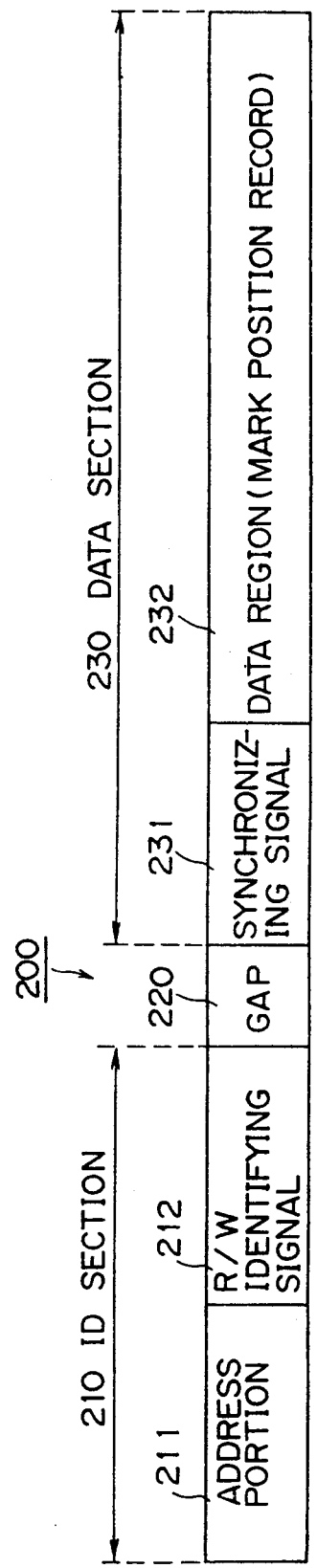

FIGS. 5A and 5B show formats of sectors in the read-exclusive and write-enable regions.

As shown in FIG. 5A, the sectors 100 on the read-exclusive region 22 comprises an ID section 110 including an address area 111 and an R/W identifying signal 112, a gap 120 where no information is recorded to absorb the rotation fluctuation of the optical disk 20, and a data section including a synchro signal 131 and a data area 132.

The address area 111 includes information such as track and sector numbers to allow the address of the sector to be identified. The R/W identifying signal 112 is intended to identify whether the sector denotes the read-exclusive region 22 or the write-enable region 24. The synchronizing signal 131 allows data recorded on the data area 133 to be read in synchronization with clocks.

The sectors 100 are recorded in the form of concaves and/or convexes on the disk's substrate.

As shown in FIG. 5B, the sector 200 on the write-enable region 24 has the same arrangement as that on the read-exclusive region 22. It comprises an ID section 210 including an address area 211 where information is contained to allow the address for the sector 200 to be identified and an R/W identifying signal 212 which represents that the sector 200 is for the write-enable region 24, a gap 220 similar to the gap 120, and a data section 230 including a synchro signal 231 similar to the synchronizing signal 131 and a data area 232 where data is recorded.

The recording of information is carried out by forming the domain thermo-magnetically. On the other hand, the reproducing of information is carried out by radiating the laser beam spot having weak linear polarization, onto the domains.

Figure 6:
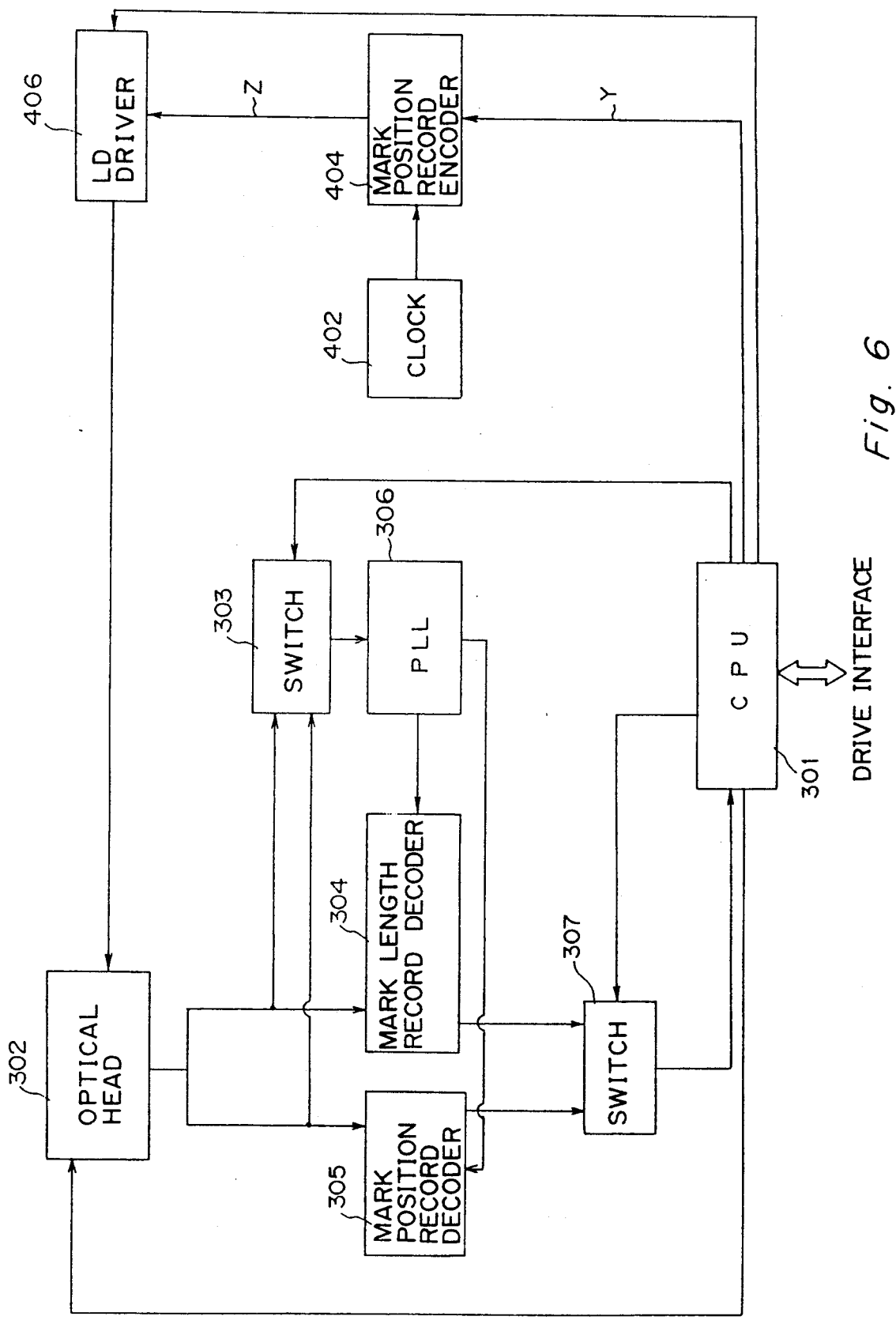
FIG. 6 is a block diagram of an embodiment of the optical disk drive circuit according to the present invention for controlling the reading and writing of information relative to the disk.

FIG. 6 is a block diagram the disk drive circuit for recording information on and reproducing information from the optical disk 20.

A CPU 301 controls a block of the circuit in response to commands supplied from an upper system such as a host computer through the drive interface. It writes data transmitted from the upper system into the sector on the optical disk 20 and reads data designated by the upper system from the sector on the optical disk 20 and transmits it to the upper system through the drive interface.

An optical head 302, comprising optical and drive systems, collects a laser beam from a semiconductor laser such as a laser diode and radiates the laser beam onto target positions of the optical disk 20 to record or erase information on it. It also converts reflected light into electrical signals to reproduce information from the disk 20.

The optical system serves to focus the laser beam spot onto the optical disk 20 and detect the positional shift of the laser beam spot relative to the target positions of the optical disk 20. This optical system comprises a semiconductor laser, lenses (coupling, focusing and objective lenses), prisms (beam splitter and knife edge prism), a ¼ wave plate and a photo-diode (not shown). The drive system carries out focusing and tracking controls to cause the objective lens to follow the disk surface and tracks so that the position of the laser beam spot can be fixed relative to the targets of the optical disk 20. The drive system consists mainly of a magnet, or/and coils and support members.

Data recorded on the optical disk 20 and coded according to mark-length or modulation is reproduced from the optical head 302, converted into an electrical signal and transmitted to a switch 303, a mark length recording decoder 304 and a mark position recording decoder 305.

The optical disk 20 is rotated by a spindle motor (not shown) and a circuit for controlling the rotation of the spindle motor is also included in the disk drive circuit. This rotation control circuit is controlled by the CPU 301.

The disk drive circuit further includes servo-control systems comprising a focusing servo-line (or system) for holding the beam waist of the laser and its vicinity on the recording surface of the optical disk 20, a seeking servo-line for moving the laser beam spot to the target track of the disk 20, and a tracking servo-line for causing the laser beam spot to follow the target track of the disk 20.

A mark position recording encoder 404 synchronizes write data Y applied from the CPU 301 with a clock of 6.6MHz applied from a clock 402 to create a mark-position-modulated waveform train Z of binary values and applies it to a laser diode driver 406 (hereinafter referred to as an LD driver).

The LD driver 406 controls the laser beam of the laser diode in the optical head 302 in response to the applied waveform train Z. More specifically, when it receives a signal representing "1", LD driver 406 controls the laser diode to shoot a strong laser beam and when it receives a signal representing "0", it maintains the laser diode with a weak intensity.

Switches 303 and 307 serve to change over signals applied through their two input terminals and transmit them, depending upon whether the optical head 302 is in a mode for reading information from the read-exclusive region 22 (hereinafter referred to as ROM region read mode) or in a mode for reading information from the write-enable region 24 (hereinafter referred to as RAM region read mode).

Switch 303 transmits the code data which is read from the read-exclusive region 22 by the optical head 302 and which is mark-length-modulated to a PLL 306 under the ROM region read mode. It also transmits the code data which are read from the write-enable region 24 by the optical head 302, and which is mark-length-modulated to the PLL 306 under the RAM region read mode. Code data read and mark-length-modulated under the ROM region read mode is applied to the mark length recording decoder 304, while code data read and mark-position-modulated under the RAM region read mode is applied to the mark position recording decoder 305.

The PLL 306 is a phase locked loop for generating a synchro signal in response to the fundamental period of code data applied through the switch 303. It supplies the synchro signal to the mark length and mark position recording decoders 304 and 305.

The mark-length and mark position recording decoders 304 and 305 demodulate code data into data bit trains responsive to the synchro signals applied from the PLL 306 and transmits them to the switch 307.

The switch 307 transmits the data bit train, which is demodulated and output by the mark-length recording decoder 304 to the CPU 301 under the ROM region read mode, while it transmits the data bit row, which is demodulated and output by the mark position recording decoder 305 to the CPU 301 under the RAM region read mode.

The CPU 301 transmits the data bit trains applied from the switch 307 to the host computer through the interface (not shown).

The CPU 301 also controls the laser diode through the LD driver 406 in such a way that a weak laser beam is radiated onto the pit to be read under the ROM region read mode and onto the magnetic domain to be read under the RAM region read mode.

Figure 7:
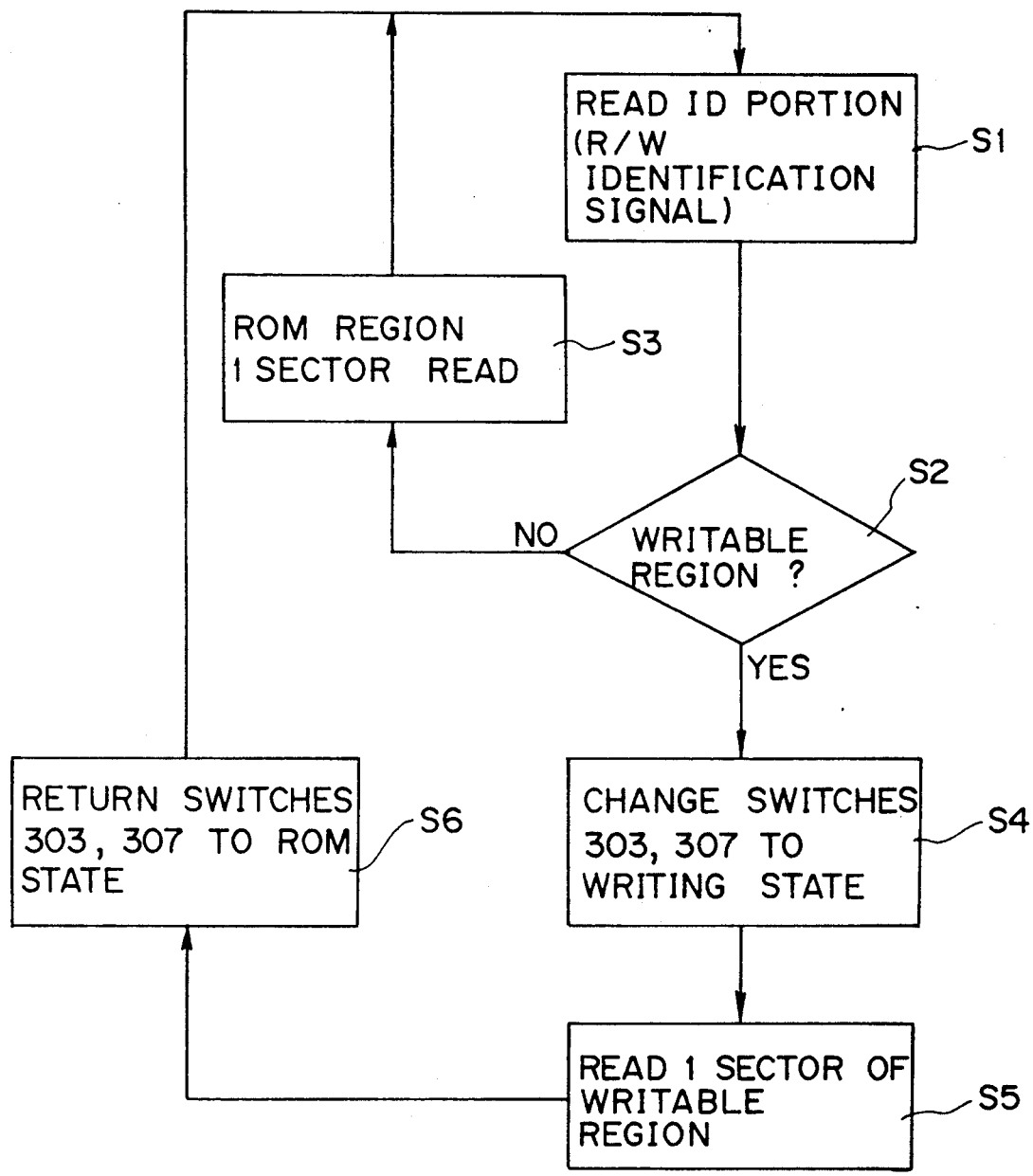
FIG. 7 is a flowchart showing a reading sequence performed in the embodiment shown in FIG. 6.

Next, the operation is explained when the data is read from read-exclusive region 22 or is read or written into write-enable region 24 of optical disk 20 by referring to FIGS. 6 and 7.

Usually, upon reading, switches 303 and 307 are set as a ROM region reading mode.

1) Behavior of Reading Sectors from the Read-exclusive Region of the Optical Disk:

When the CPU 301 receives the address information (track and sector numbers) of data to be read, the optical disk 20 is rotated at 1800 rpm through the rotation control system and a weak laser beam is radiated through the LD driver 406 and the laser diode in the optical head 302 onto the rotating optical disk 20, so that the ID section 110 of a sector 100 of the track denoted by the track number indicated by the address infromation can be read. This reading of the ID section 110 is carried out through the optical head 302, mark length recording decoder 304 and switch 307. When the ID section 110 is read out, it is judged by a R/W identification signal (S1), whether the sector designated by the address portion 111 is within the read-exclusive region or within a write-enable region. When the sector is judged as the read-exclusive region (S2), 1 sector in ROM region is read out (S3). Namely, the target sector 100 is detected by successively reading the ID sections 110. When it is thus detected, data area 132 is read through the optical head 302, mark-length recording decoder 304 and switch 307.

2) Behavior of Reading Data from the Sector of the Write-enable Region on the Optical Disk:

When the CPU 301 receives the address information (track and sector numbers) of data to be read, the optical disk 20 is rotated at 1800 rpm through the rotation control system and a weak laser beam is radiated through the LD driver 406 and the laser diode in the optical head 302 onto the rotating optical disk 20, so that the ID section 210 of a sector 200 of the track denoted by the track number indicated by the address information can be read. This reading of the ID section 210 is carried out through the optical head 302, mark length recording decoder 304 and switch 307. When the ID section 210 is read out, it is determined by a R/W identification signal (S1) whether the sector designated by the address portion 211 is within the read-exclusive region or within a write-enable region. When the sector is determined as the writable region (S2), after reaching ID section 210, switches 303 and 307 are set to RAM region reading mode (S4). When the target sector 200 is detected upon reading the ID section 210, data region 232 of sector 200 is read out through optical head 302, mark position recording decoder 305 and switch 307 (S5). After reading the target sector, switches 303 and 307 are returned to the ROM region reading mode (S6).

3) Behavior of writing data into the sector of the write-enable regions on the optical disk:

When the CPU 301 receives the address information (track and sector numbers) of data to be read, the optical disk 20 is rotated at 1800 rpm through the rotation control system and a weak laser beam is radiated through the LD driver 406 and the laser diode in the optical head 302 onto the rotating optical disk 20, so that the ID section 210 of a sector 200 of the track denoted by the track number indicated by the address infromation can be read. This reading of the ID section 210 is carried out through the optical head 302, mark length recording decoder 304 and switch 307. The sector designated by the address information is determined as being within write-enable region 24 by enabling the R/W identification signal to determine whether the sector is within read-exclusive area 22 or within write-enable region 24. Then the target information is written into the data area 232 of the target sector 200 of write-enable region 24 through the mark position recording encoder 404, LD driver 406 and optical head 302. Where it is determined by the R/W identifying signal that the sector is not within write-enable region 24, then the writing operation is not conducted.

Figure 8:
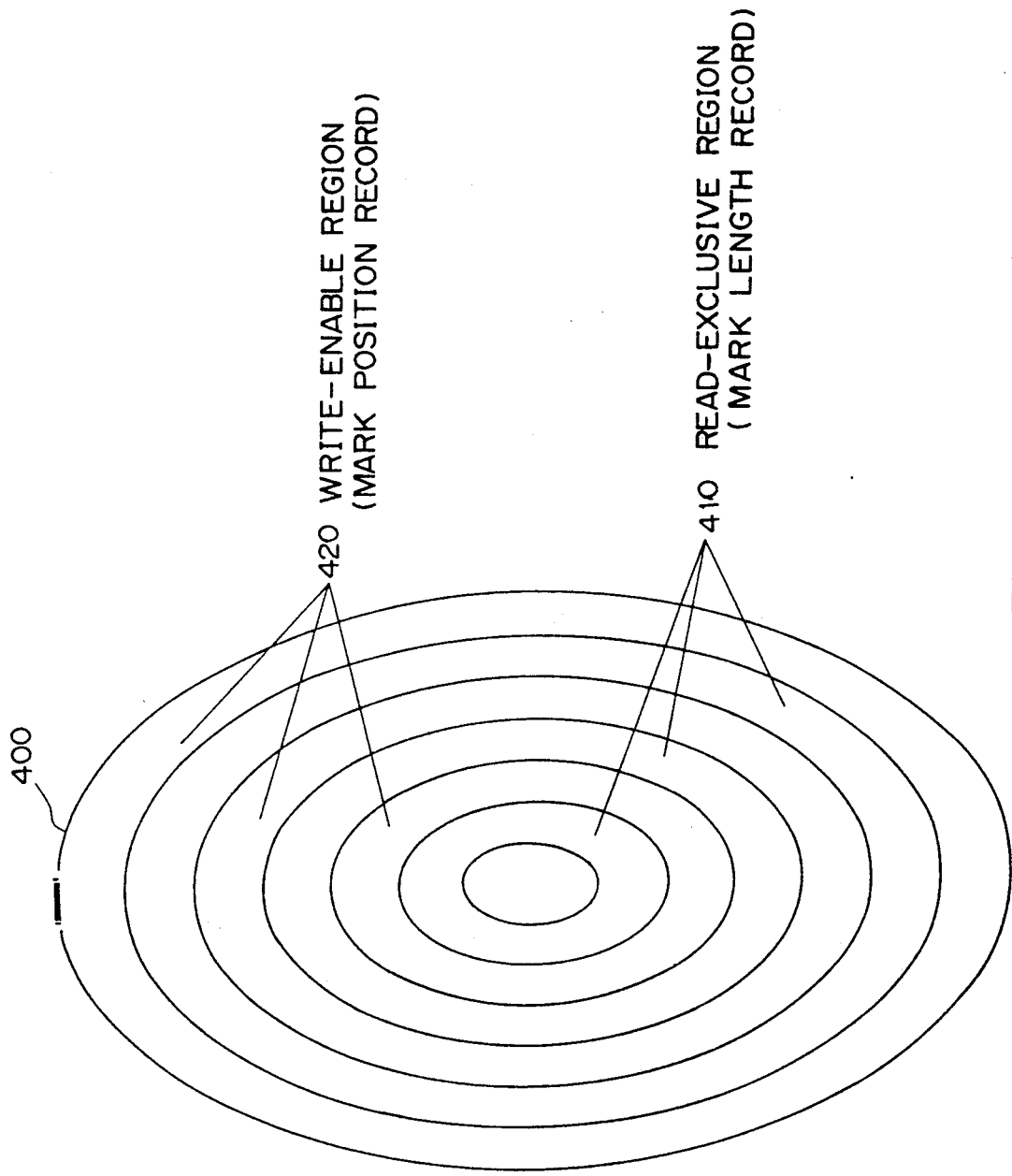
FIG. 8 shows a second example of an optical disk according to the present invention.

FIG. 8 shows a second example of the optical disk according to the present invention.

As shown in FIG. 8, read-exclusive and write-enable regions 410 and 420 are alternately arranged on the optical disk 400, from the inner circumference to the outer circumference of the optical disk 400.

Information is recorded on the read-exclusive regions 410 according to the mark length recording system and on the write-enable regions 420 according to the mark position recording system.

A first application of the second optical disk 400 will be described below. Information recording on the optical disk 400 is carried out under the conditions shown in Table 2.

TABLE 2

|  | Read-exclusive Region | Write-enable Region |
|---|---|---|
| Position in the radial direction of disk | 30–35, 40–45 50–55 mm | 35–40, 45–50 55–60 mm |
| Rotation speed | 3600 rpm | 3600 rpm |
| Recording frequency | 3.3 MHz | 6.6 MHz |

As shown in Table 2, read-exclusive regions 410, each 5 mm wide, are concentrically arranged on the optical disk 400 at 5 mm intervals, that is, with a write-enable region 420 interposed between them and extending from 30 to 35 mm, from 40 to 45 mm, and from 50 to 55 mm in the radial direction of the disk 400. Write-enable regions 420, each 5 mm wide, are also concentrically arranged on the optical disk 400 at 5 mm intervals, that is with a read-exclusive region interposed between them and extending from 35 to 40 mm, from 45 to 50 mm and from 55 to 60 mm in the radial direction of the disk 400.

When the information is to be reproduced and recorded, the rotation of the disk 400 is controlled in both the read-exclusive region 410 and the write-enable regions 420 according to the CA system. In other words, the optical disk 400 is rotated at a constant rotation angular velocity, or at a rotation speed of 3600 rpm. Information is recorded on the read-exclusive regions 410 at a frequency of 3.3 MHz and on the write-enable regions 420 at a frequency of 6.6MHz.

For this first application of the second optical disk 400, the recording frequency on the write-enable regions 420 is made double that on the read-exclusive regions 410, thus providing identical storage capacities per track on both regions 410 and 420, i.e., to provide identical storage density in each track on both regions 410 and 420.

When read-exclusive and write-enable regions 410 and 420 are alternately arranged on the optical disk 400 in the radial direction thereof, as described above, the optical head 302 may be moved only 5 mm on the optical disk 400 in the radial direction thereof in order to write new information. An old information is recorded at the radial position 30 mm on the read-exclusive region 410 and a new information may be written in an optional sector on the write-enable regions 420 enabling access to be gained relative to the optical disk 400 at a higher speed than the first optical disk 20 wherein the optical head must be moved a maximum of 70 mm in the radial direction thereof.

Namely, read-exclusive regions 410 are arranged radially on the optical disk 400 with a write-enable region 420 interposed between them in the case of the first application of the second optical disk 400. Therefore, new information concerning information recorded on the read-exclusive regions 410 can be written on a write-enable region 420, as near as possible to the center of the optical disk 400, and this enables access time to be further shortened.

A second application of the second optical disk 400 will be described below. Here, information recording on the optical disk 400 is carried out under the conditions shown in Table 3.

As shown, read-exclusive and write-enable regions 410 and 420 are alternately arranged radially on the optical disk 400, as in the case of the first application of the second optical disk 400, but the rotation angular velocity of the optical disk 400 is made lower for writing and erasing cycles. That is, the rotation speed of the disk is set at 2400 rpm only when information is written on and erased from the optical disk 400.

TABLE 3

|  | Read-exclusive Region | Write-enable Region |
|---|---|---|
| Position in the radial direction of the disk | 30–35, 40–45 50–55 mm | 35–40, 45–50 55–60 mm |
| Rotation speed | 3600 rpm | 2400 rpm (only for information writing and erasing processes) 3600 rpm (others) |
| Recording frequency | 3.3 MHz | 4.4 MHz (at 2400 rpm) 6.6 MHz (at 3600 rpm) |

The angular velocity is made low only for information writing and erasing processes. This is to solve the problem that when the strength per unit area of a laser beam spot is low and the angular velocity is high, recording sensitivity becomes low. Therefore, the rotation speed of the optical disk 400 is set to 2400 rpm or less when information is written on or erased from the write-enable regions 420. In addition, the recording frequency is set to 4.4MHz or less to enable the write-enable regions 420 to have the same storage capacity per track, i.e., identical storage density per each track on both regions 410 and 420 as in the first application of the second optical disk 400.

The rotation speed of the optical disk 400 for the information reading process is set at 3600 rpm for both the read-exclusive and write-enable regions 410 and 420 and the rotation control of the disk for this process is carried out in the same manner as in the first application of the second optical disk 400. The recording frequency for this process by converting the same rotation number is set at 6.6MHz on the write-enable regions 420, double the reproduction frequency at which the data is read from the write-enable region 420 when the recording frequency is 3.3 MHz on the read-exclusive regions 410. This is because the recording density according to the mark length recording system is double that according to the mark position recording system.

A third application of the second optical disk 400 will now be described. Information recording is carried out under the conditions as shown in Tables 4 and 5. Table 4 shows the conditions under which information recording is conducted on the write-enable regions 420 and Table 5 shows the conditions under which information recording is carried out on the read-exclusive regions 410.

As is apparent from positions in the radial direction of the disk shown in Tables 4 and 5, the read-exclusive and write-enable regions 410 and 420 are alternately arranged on the disk in the radial direction thereof as seen in the first and second applications of the second optical disk.

TABLE 4

| (Recording manner in write-enable region 420) | | | | |
|---|---|---|---|---|
|  | Rotation speed | | Recording frequency | |
| Position in the radial direction of disk | Only for writing and erasing | Others | Only for writing and erasing | Others |
| 35–40 mmR | 4777 rpm | 5400 rpm | 8.8 MHz | 9.9 MHz |
| 45–50 | 3822 | 5400 | 9.0 | 12.7 |

TABLE 4-continued (Recording manner in write-enable region 420)

| Position in the radial direction of disk | Rotation speed | | Recording frequency | |
|---|---|---|---|---|
| | Only for writing and erasing | Others | Only for writing and erasing | Others |
| 55–60 | 3185 | 5400 | 9.2 | 15.5 |

TABLE 5

(Recording manner in read-exclusive region 410)

| Position in the radial direction of disk | Rotation speed | Recording frequency |
|---|---|---|
| 30–35 mmR | 5400 rpm | 5.0 MHz |
| 40–45 | 5400 | 6.4 |
| 50–55 | 5400 | 7.8 |

As shown in Table 4, the rotation speeds of the disk 400 for the information writing and erasing processes are set at 4777 rpm, 3822 rpm and 3185 rpm on the respective write-enable regions 420, from 35–40 mm, 45–50 mm and 55–60 mm in the radial direction. Thus, a linear velocity of 20 m/sec at positions 40 mm, 50 mm and 60 mm is maintained in the radial direction.

Corresponding to these rotation speeds, respective recording frequencies are set at 8.8(8.75)MHz, 9.0MHz and 9.2(9.17)MHz on the writeenable regions 420 so as to maintain the bit length (or domain length at 1 μm at respective positions 35mm, 45mm and 55mm in the radial direction.

The rotation speed of the disk used when information is read from the write-enable regions 420 is constant, at 5400 rpm. Therefore, the frequency (or reproducing frequency or reading clock) for reading information from the write-enable regions 420 becomes 9.9MHz, 12.7MHz and 15.5MHz on the write-enable regions 420, from 35–40 mm, 45–50mm and 55–60 mm, respectively.

As shown in Table 5, the rotation speed of the disk for the read-exclusive regions 410 is set at 5400 rpm in the same manner as for the write-enable regions 420, but the recording frequencies are set at 5.0MHz, 6.4MHz and 7.8MHz on the read-exclusive regions 410, from 30–35 mm, 40–45 mm and 50–55 mm, respectively. That is, the recording frequency is set at half the frequency for the write-enable region 420 located outside its adjacent read-exclusive region 410.

The variation of the recording sensitivity in respective write-enable regions 420 can be made small by changing the rotation angular velocity in several stages. In the case of the first and second applications of the second optical disk 400, however, the rotation speed of the disk employed when information is written and erased is made certain (3600 rpm) on all of the write-enable regions 420. The linear velocity becomes higher as it approaches the outer circumference of the disk. The same can be said about the recording sensitivity. The third application of the second disk 400 is intended to solve this problem.

For the above-described embodiments of the present invention, the write -enable region is a recording film of a type on which information can be recorded according to a light modulation system. However, the recording film may be made of other materials, such as a vertical magnetic material, which enables information to be recorded according to the magnetic modulation of the system, or an optical memory material of the phase change type.

The rotation speeds and recording frequencies employed by the above-described embodiments are not limited to the above-mentioned values, but may be freely selected depending upon how the optical disk is to be used.

The present invention comprises two kinds of the regions, namely, a read-exclusive region on which information is prerecorded and from which information can only be read out, and a write-enable region on which information is rewritable. Therefore, by writing information which must avoid the rewriting operation and is recorded in a read-exclusive region an inadvertent rewrite of information can be surely prevented. Thus, the user can use the write-enable region as a work region, thereby enabling the optical disk of the present invention to be applied to various uses and achieving a great practical advantage.

What is claimed is:

1. An optical disk, comprising:
a read-exclusive region on which information recorded according to a mark-length recording system is located on an inner edge of the disk in the radial direction thereof; and
a write-enable region, on which information is recorded and reproduced recording to a mark position recording system by a doubled recording of reproducing frequency used in the mark-length recording system that is located on an outer side of the disk in the radial direction thereof, the mark-length and mark position recording system are carried out while rotating the optical disk at a constant rotation angular velocity, thereby providing an optical disk having a storage capacitor per track of information recorded on said write-enable region which becomes equal to the storage capacity per track of information recorded on said read-exclusive region.

2. An optical disk, comprising:
read-exclusive regions; and
write-enable regions, said read-exclusive and write-enable regions are alternately and concentrically arranged on the disk distributed radially from an inner circumference to an outer circumference of the disk, information being reproduced from said read-exclusive regions according to a mark-length recording system and information being recorded on and reproduced from said write-enable regions according to a mark position recording system, the recording or reproducing frequency used in the mark position recording system is double that used in the mark-length recording system, the mark-length and mark-position recording systems conducted while rotating the optical disk at a constant rotational angular velocity, thereby providing an optical disk having a storage capacity per track of information recorded on said write-enable regions equal to that of information recorded on said read-exclusive regions.

3. An optical disk, comprising:
read-exclusive regions; and
write-enable regions, said read-exclusive regions and said write-enable regions being alternately and concentrically arranged on the disk, distributed radially from an inner circumference to an outer circumference of the disk, information being reproduced from said read-exclusive regions according to a mark-length recording system and information being recorded on the reproduced from said write enable regions according to a mark position recording system, rotational angular velocity of the disk being employed when information is written on or erased from said write-enable regions according to the mark position recording system and is made lower than that employed when information is reproduced from said read-exclusive regions, and the recording frequency employed when information is recorded on or erased from said write-enable regions is set on the basis of the rotational angular velocities such that storage capacity per track on said write-enable regions becomes equal to that on said read-exclusive regions, a rotational angular velocity of the disk employed when information is reproduced from said write-enable regions is the same as that employed when information is reproduced from said read-exclusive regions, and the recording frequency used in the mark position recording system is double that used in the mark-length recording system.

4. An optical disk, comprising:

read-exclusive regions; and write-enable regions, said read-exclusive and write enable regions being alternately and concentrically arranged on the disk, distributed radially from an inner circumference to an outer circumference of the disk, information being reproduced from said read-exclusive regions according to a mark-length recording system and information being recorded on and reproduced from said write-enable region according to a mark-position recording, when information is to be recorded on said write-enable regions according to the mark position recording system, rotation control of the disk is carried out according to a multi-stage CAV method in which a rotational angular velocity is changed in several stages in accordance with a radial position of the disk, a variable controls a recording frequency employed when information is recorded on or erased from said writ-enable regions is conducted such that storage capacity per track of information recorded on said write-enable region becomes equal to that of information recorded on said read-exclusive region corresponding to information recorded on said write-enable regions:

each of said read-exclusive regions is followed by each of said write-enable regions, each of said read-exclusive regions is located at an inner portion from each of said write-enable regions, thereby constructing a pair including one of said read-exclusive regions and one of said write-enable regions having regions having equal storage capacity per track of information recorded, the storage capacity per track of information recorded is increased step-by-step as the radial position increases as a trigger when a linear velocity of the write-enable region of the radial position of the disk exceeds a predetermined value.

5. An optical disk according to claim 4 wherein the rotation angular velocity of the disk employed when information is read from the read-exclusive regions is identical to that employed when information is read from the write-enable regions.

6. An optical disk according to claim 2, wherein said write-enable region is provided on the side of said optical disk other than said read-exclusive region.

7. An optical disk according to claim 3, wherein the recording frequency (fω) employed when information is recorded on or erased from said write-enable regions is set to $$f\omega = \frac{2\eta\omega}{\eta r} \cdot fr$$

where, fω is the recording frequency employed when information is recorded on or erased from said write-enable regions fr is the recording frequency used in the mark-length recording system, ηω is the number of rotations used in the write-enable regions, and ηr is the number of rotations used in the mark-length region regions.

* * * * *

UNITED STATES PATENT AND TRADEMARK OFFICE
CERTIFICATE OF CORRECTION

PATENT NO.  : 5,214,627
DATED       : MAY 25, 1993
INVENTOR(S) : KAZUO NAKASHIMA ET AL.

It is certified that error appears in the above-indentified patent and that said Letters Patent is hereby corrected as shown below:

Col. 3,  line 32,  "convexe" should be --convex--.

Col. 4,  line 24,  "tracks," should be --tracks--.

Col. 13, line 30,  "writeenable" should be --write-enable--;
         line 31,  "length" should be --length)--.

Col. 14, line 28,  "recording" should be --according--;
         line 29,  "of" should be --or--;
         line 33,  "system" should be --systems--;
         line 36,  "capacitor" should be --capacity--.

Col. 15, line 3,   "the" should be --and--;
         line 43,  "region" should be --recording--.

Signed and Sealed this

Twenty-sixth Day of April, 1994

Attest:

BRUCE LEHMAN

*Attesting Officer*     *Commissioner of Patents and Trademarks*